(12) United States Patent
Alfano

(10) Patent No.: US 8,827,201 B2
(45) Date of Patent: Sep. 9, 2014

(54) ROTORCRAFT STRUCTURAL ELEMENT FOR REDUCING AERODYNAMIC DRAG

(75) Inventor: David Alfano, Aix en Provence (FR)

(73) Assignee: Airbus Helicopters, Marignane Cedex (FR)

( * ) Notice: Subject to any disclaimer, the term of this patent is extended or adjusted under 35 U.S.C. 154(b) by 0 days.

(21) Appl. No.: 13/307,448

(22) Filed: Nov. 30, 2011

(65) Prior Publication Data

US 2012/0138731 A1 Jun. 7, 2012

(30) Foreign Application Priority Data

Dec. 6, 2010 (FR) ...................................... 10 04748

(51) Int. Cl.
  *B64C 27/82* (2006.01)
  *B64C 23/06* (2006.01)
  *B64C 21/10* (2006.01)
  *B64C 1/00* (2006.01)
  *B64C 7/00* (2006.01)

(52) U.S. Cl.
  CPC ......... *B64C 23/06* (2013.01); *B64C 2027/8254* (2013.01); *B64C 27/82* (2013.01); *B64C 1/0009* (2013.01); *B64C 7/00* (2013.01); *B64C 21/10* (2013.01); *Y02T 50/12* (2013.01); *Y02T 50/166* (2013.01); *Y02T 50/162* (2013.01)
  USPC .................. 244/17.19; 244/17.11; 244/199.1; 244/200.1

(58) Field of Classification Search
  USPC ............. 244/17.11, 17.19, 199.1, 199.4, 200, 244/200.1
  See application file for complete search history.

(56) References Cited

U.S. PATENT DOCUMENTS

| 2,074,201 | A | * | 3/1937 | Bechereau | 244/91 |
| 3,463,418 | A | * | 8/1969 | Miksch | 244/200.1 |
| 3,506,219 | A | * | 4/1970 | Mouille et al. | 244/17.21 |
| 3,578,264 | A | * | 5/1971 | Kuethe | 244/200.1 |
| 4,343,506 | A | * | 8/1982 | Saltzman | 244/53 B |
| 4,455,045 | A | * | 6/1984 | Wheeler | 244/200 |
| 4,718,620 | A | * | 1/1988 | Braden et al. | 244/130 |
| 4,776,535 | A | * | 10/1988 | Paterson et al. | 244/130 |

(Continued)

FOREIGN PATENT DOCUMENTS

| EP | 0724691 A1 | 8/1996 |
| EP | 1527992 A2 | 5/2005 |

(Continued)

OTHER PUBLICATIONS

Near-Wake Flow Dynamics Resulting from Trailing Edge Spanwise Perturbation. Hangan and Naughton. Published by the American Institute of Aeronautics and Astronautics, pp. 1-9, 2008.

(Continued)

*Primary Examiner* — Tien Dinh
*Assistant Examiner* — Steven Hawk
(74) *Attorney, Agent, or Firm* — Brooks Kushman P.C.

(57) ABSTRACT

A fairing (1) for a structural element of a rotorcraft, the fairing including a rear portion (2) that is substantially orthogonal to the longitudinal direction (L) of the aircraft, extending between two spaced-apart trailing edges (3, 4) and thus presenting a determined width, said rear portion (2) closing at least part of the internal volume defined by the fairing (1) and generating aerodynamic drag in forward flight. According to the invention, the rear portion presents, at least at the trailing edges (3, 4), a shape that is perturbed on the streamlines (5) of the air-flow.

20 Claims, 1 Drawing Sheet

(56) References Cited

U.S. PATENT DOCUMENTS

| | | | |
|---|---|---|---|
| 4,809,931 A * | 3/1989 | Mouille et al. | 244/17.11 |
| 4,813,635 A * | 3/1989 | Paterson et al. | 244/130 |
| 4,830,315 A * | 5/1989 | Presz et al. | 244/200 |
| 4,986,496 A * | 1/1991 | Marentic et al. | 244/130 |
| 5,058,837 A * | 10/1991 | Wheeler | 244/200.1 |
| 5,069,403 A * | 12/1991 | Marentic et al. | 244/200 |
| 5,102,067 A * | 4/1992 | Weiner et al. | 244/17.19 |
| 5,108,044 A * | 4/1992 | Weiner et al. | 244/17.19 |
| 5,131,604 A * | 7/1992 | Yoerkie et al. | 244/17.19 |
| 5,133,516 A * | 7/1992 | Marentic et al. | 244/200 |
| 5,289,997 A * | 3/1994 | Harris | 244/200 |
| 5,454,691 A * | 10/1995 | Henri et al. | 244/17.19 |
| 5,566,907 A * | 10/1996 | Marze et al. | 244/17.19 |
| 5,588,618 A * | 12/1996 | Marze et al. | 244/17.19 |
| 5,634,611 A * | 6/1997 | Marze et al. | 244/17.19 |
| 5,810,285 A * | 9/1998 | LeMasurier | 244/17.19 |
| 5,833,389 A * | 11/1998 | Sirovich et al. | 405/52 |
| 5,860,626 A * | 1/1999 | Moser | 244/200 |
| 6,345,791 B1 * | 2/2002 | McClure | 244/200 |
| 6,634,700 B1 * | 10/2003 | Calvert | 296/180.4 |
| 6,959,958 B2 * | 11/2005 | Basford | 296/180.1 |
| 7,255,387 B2 * | 8/2007 | Wood | 296/180.1 |
| 7,275,721 B2 * | 10/2007 | Kallinen | 244/200.1 |
| 7,676,923 B2 * | 3/2010 | Maille et al. | 29/889.2 |
| 2008/0217484 A1 | 9/2008 | Bender | |
| 2009/0236872 A1 * | 9/2009 | Wood | 296/180.1 |

FOREIGN PATENT DOCUMENTS

| | | | |
|---|---|---|---|
| GB | 577524 A | 5/1946 | |
| JP | 2000155496 A | 6/2000 | |
| JP | 2000255496 A * | 9/2000 | B64C 27/82 |

OTHER PUBLICATIONS

Search Report and Written Opinion; Application No. FR. 1004748; dated Jul. 4, 2011.

Korean Office Action Dated Sep. 5, 2013 ,Application No. 10-2011-0128348, Applicant Eurocopter, 7 Pages.

* cited by examiner

ROTORCRAFT STRUCTURAL ELEMENT FOR REDUCING AERODYNAMIC DRAG

CROSS REFERENCE TO RELATED APPLICATIONS

The present invention claims priority from French patent application No. 10/04748 filed on Dec. 6, 2010, the content of which is incorporated herein.

BACKGROUND OF THE INVENTION (1) Field of the Invention

The invention relates to the general technical field of aviation, and more precisely to the construction of aircraft structural elements, in particular for rotary wing aircraft such as rotorcraft. Such structural elements, that need to be distinguished from airfoil surfaces, often give rise to aerodynamic drag. When designing aircraft, and in particular rotorcraft, specifically helicopters, it is always desirable to reduce as much as possible the aerodynamic drag generated by the various structural elements making up the aircraft.

The present invention relates more particularly to a ducted tail rotor for a helicopter, known as a Fenestron®, or more generally a structural element that has a certain amount of thickness, and that is of a shape that generates aerodynamic drag.

(2) Description of Related Art

By way of example, certain ducted tail rotors of the Fenestron® type have a rear portion that is terminated by a clearly-defined base, e.g. by a part that extends substantially orthogonally relative to the forward direction and that closes the rear portion of the Fenestron fairing. Downstream from its clearly-defined base the fairing of such a tail rotor thus presents a width that suddenly becomes zero. Such a shape gives rise to a considerable amount of wake and is responsible for a non-negligible portion of the aerodynamic drag. Such a shape therefore penalizes the aerodynamic performance of the aircraft in forward flight.

The flow of air downstream from the clearly-defined base becomes massively separated from the structure and it is this aerodynamic separation, i.e. a relatively extensive zone in which turbulence and vortices are concentrated, that gives rise to a large amount of energy dissipation and also to vibration that is induced by aerodynamic forces.

In order to reduce those drawbacks, proposals have been made to replace the clearly-defined base with a portion of fairing that terminates in a profiled shape. Such a change of shape is found to be effective in terms of drag only if the relative thickness of the fairing is less than 15%.

The relative thickness is the value of the ratio between the maximum thickness of the fairing in the direction extending transversely to the flow divided by its length (the dimension that it occupies in the longitudinal direction of the flow).

Such a relative thickness requires a large amount of length (chord of the fairing), given the fairing needs sufficient width to enable it to house the anti-torque rotor. The use of such a profiled portion therefore increases the weight of the aircraft. This increase in weight is also located very far to the rear of the center of gravity of the aircraft, thereby giving rise to problems of centering the aircraft. Furthermore, such a profiled portion gives rise to problems in terms of flight quality, in particular heading instability of the aircraft. Such heading instability may indeed appear with a reduced drag in flight, but where the location of the separation of the airflow from the structural element is at a position that is unstable. Since the flapping of the wake is not localized in the same place, it gives rise to natural self-sustaining oscillations in the forces generated by the fairing, in particular in terms of yaw. The pilot can then sense yaw oscillations about the heading (route) as set by the pilot that come from the tail of the helicopter.

Such a profiled portion may also generate asymmetry in terms of lateral flight of the aircraft. The greater the lateral surface area of the fairing, the more it opposes movement during lateral flight. For example, lengthening the tail of a Fenestron causes it to offer a larger surface area to wind in lateral flight.

A rotorcraft rotor blade is also known, e.g. from document EP 0 724 691, that has aerodynamic portions in relief that improve the aerodynamic characteristics of the blade, in order to enhance the flow of the surrounding fluid. Those portions in relief are formed in particular by waves arranged in the general plane of the blade, both as projections and as depressions. Those waves give rise to variations in the thickness of the blade that are distributed along its span, both on its suction side and on its pressure side. Those portions in relief are also formed by varying the curvature of the blade in its depth direction, said portions in relief being arranged as sawteeth distributed along the span of said blade, at least at its leading edge, and possibly also at its trailing edge. That document therefore relates very specifically to airfoil surfaces of a rotorcraft.

Also known is the document "Near-wake flow dynamics from trailing edge spanwise perturbation" 4[th]Conference on fluid control, Jun. 23-26, 2008, Seattle, Wash. That publication relates to a study of three-dimensional fluid flow at the rear of a thin plate that is subjected to periodic sinusoidal geometrical perturbations in the span direction. Such a plate therefore has a truncated trailing edge of sinusoidal shape in the span direction, thereby generating aerodynamic forces. The results of that study show that in comparison with a structure of the thin plate type having a truncated and flat trailing edge, thereby generating von-Karman-Bernard turbulence, sinusoidal perturbations significantly modify the structure of the wake and have a strong and favorable influence on the three-dimensional von-Karman-Bernard vortices.

By altering the geometrical shape of the base of the fairing, natural instabilities that are present in the wake are encouraged to grow. The vortices that are created in the portion of the wake that is very close to the base are therefore naturally caused to dissipate more quickly because of the geometrical modifications that give rise to aerodynamic perturbations.

The results of that document do not relate to structural elements of a rotorcraft that present a certain amount of width. In addition, the problems of drag induced by such perturbations are not addressed in that document.

In addition to the documents EP 0 724 691 and "Near-wake flow dynamics from trailing edge spanwise perturbation", other documents should also to be taken into consideration.

Document GB 577 524 describes a rotary wing aircraft having an anti-torque tail rotor. Suction openings for the anti-torque rotor are provided on opposite side walls of a tail boom of the aircraft. The blades of a main rotor drive a stream downwards, which stream is forced into the fuselage through an air inlet under the main rotor, and is then channeled to the suction openings in the opposite side walls of the tail beam.

Document EP 1 527 992 describes an airfoil surface in the form of a wing with a flap arranged to create a vortex. Concave grooves are provided in the longitudinal direction of the aircraft.

Document JP 2000/255496 describes horizontal grooves in an anti-torque rotor fairing, the grooves all being parallel in a plane that is longitudinal and horizontal, and the grooves all being transversely continuous from one edge to the other of the fairing.

Other documents such as U.S. Pat. No. 6,345,791 and US 2008/0217484 describe aerodynamic airfoil surfaces having respectively surface wrinkles or angulations of the rear free edge.

BRIEF SUMMARY OF THE INVENTION

The present invention is defined by the claims.

In an embodiment, the invention proposes a novel structural element for an aircraft of the rotorcraft kind, in particular a helicopter, the element being of a shape that enables the above-mentioned limitations to be overcome, and consequently that enables the aerodynamic drag of the aircraft in forward flight to be reduced.

In an embodiment, the invention proposes a portion of fairing for an anti-torque rotor, with the shape of said portion of fairing serving to reduce the aerodynamic drag of the aircraft in forward flight.

In an embodiment, the invention proposes a Fenestron having a fairing of a shape that serves to reduce the discontinuous perturbed drag of the aircraft in forward flight.

In an embodiment, the invention is in the form of a fairing for a structural element of a rotorcraft, the fairing including a rear portion that is substantially orthogonal to the longitudinal direction of the aircraft, said rear portion extending between two spaced-apart trailing edges and thus presenting a determined width, said rear portion closing at least part of the internal volume defined by the fairing and generating aerodynamic drag in forward flight, wherein the rear portion presents, at least at the trailing edges, a shape that is perturbed on the streamlines of the air-flow.

In an embodiment in accordance with the invention, the perturbed shape comprises projecting and recessed portions in relief extending over the entire surface of the rear portion that is located between the trailing edges.

In an embodiment in accordance with the invention, the shape of the projecting and recessed portions in relief constitutes undulations of regular dimensions.

In another embodiment in accordance with the invention, the shape of the projecting and recessed portions in relief constitutes undulations of irregular dimensions.

In an embodiment in accordance with the invention, at least some of the undulations extend from one trailing edge to the other.

In another embodiment in accordance with the invention, at least some of the undulations extend from one trailing edge at least to an intermediate zone of the rear portion, said at least one intermediate zone being located between the two trailing edges.

In an embodiment in accordance with the invention, the perturbed shape includes protrusions along each trailing edge.

In another embodiment in accordance with the invention, the perturbed shape includes cavities along each trailing edge.

The objects given to the invention are also achieved by a structural element for an aircraft and including a fairing as described above.

In an embodiment, the invention is in the form of a ducted anti-torque tail rotor for a helicopter that includes a hub having blades mounted thereon, means for driving the hub in rotation, and means for adjusting the pitch of the blades, said rotor including a fairing as described above.

In an embodiment in accordance with the invention, the fairing includes open lateral portions that are substantially parallel on either side of the hub, each of said lateral portions terminating towards the rear in a trailing edge, said rear portion of the fairing forming a base that extends between the trailing edges.

In an embodiment in accordance with the invention, the base-forming rear portion presents curvature at least in a vertical and longitudinal plane of the aircraft.

In an embodiment in accordance with the invention, the novel structural element or fairing may either present a shape that incorporates technical characteristics that mitigate the above-mentioned drawbacks, or else it may include additional parts (fitted and/or adhesively bonded thereto), e.g. presented in the form of a kit.

In an embodiment, the invention is in the form of a rotorcraft, in particular a helicopter, that includes a ducted anti-torque tail rotor as described above.

The invention presents the advantage whereby its shape, in particular the shape of its rear portion, serves to reduce the size of the separation of the mean aerodynamic flow downstream from the structural element or Fenestron. This serves to reduce drag and consequently to reduce the fuel consumption of the aircraft.

In addition, the extra weight generated by the solution in accordance with the invention is negligible.

Another advantage of the invention lies in the fact that it constitutes a solution that is passive, thereby giving rise to no recurring costs for inspection or maintenance.

Another advantage of the invention lies in the fact that it may be applied and adapted to Fenestrons of various types and sizes.

Another advantage of the invention lies in the fact that it does not degrade the flight characteristics of the aircraft, in particular for different types of flight, including lateral flight and flight with a large amount of slideslip.

BRIEF DESCRIPTION OF THE SEVERAL VIEWS OF THE DRAWINGS

The invention and its advantages appear in greater detail from the following description of an embodiment given by way of illustration and with reference to the accompanying figures, in which.

Elements that are structurally and functionally identical and that are shown in more than one of the figures are given the same numerical or alphanumerical references in each of them.

DETAILED DESCRIPTION OF THE INVENTION

Figure 1:
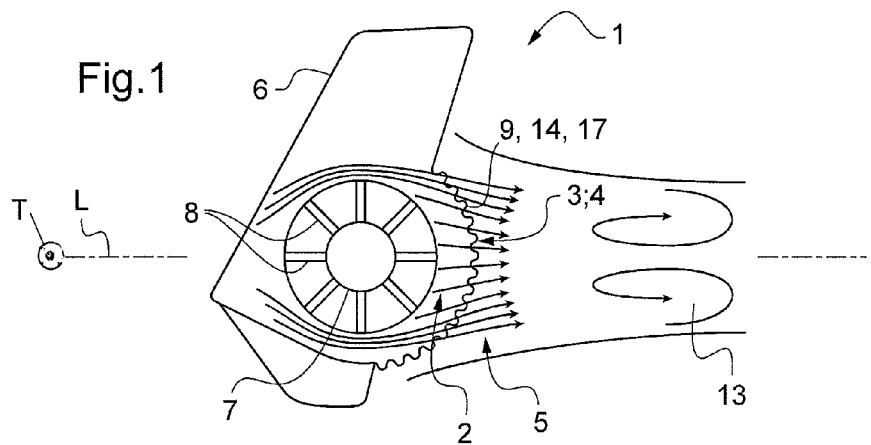
FIG. 1 shows an embodiment of a structural element in accordance with the invention shown in profile view, said structural element forming part of an anti-torque rotor of the Fenestron kind.

FIG. 1 shows an embodiment of a structural element in accordance with the invention in profile view, said structural element forming part of an anti-torque rotor of the Fenestron kind.

The Fenestron structure comprises a fairing 1 having a rear portion 2 that is substantially orthogonal to the longitudinal direction L of the aircraft. The rear portion 2 extends between two mutually spaced-apart trailing edges 3 and 4. The fairing 1 thus presents a determined width, said rear portion 2 closing at least part of the internal volume defined by the fairing 1 and generating aerodynamic drag in forward flight.

The rear portion 2 presents, at least in its trailing edges 3 and 4, a perturbed shape 14 on the air-flow streamlines 5 as represented by arrows in FIG. 1.

The fairing 1 advantageously includes a vertical tail fin 6, and it extends around a hub 7 having blades 8 mounted thereon to constitute the anti-torque rotor of the Fenestron kind.

In an embodiment in accordance with the invention, the perturbed shape of the rear portion 2 includes projecting and recessed portions in relief extending over the entire surface of the rear portion that is located between the trailing edges 3 and 4.

Figure 2:
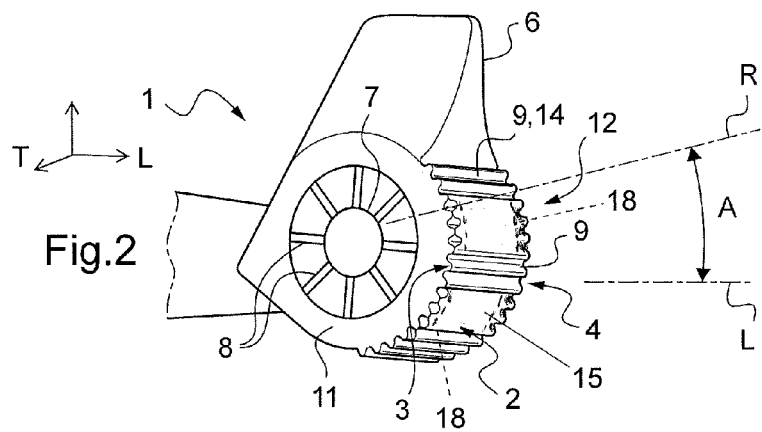
FIG. 2 is a perspective view of a structural element forming part of an anti-torque rotor of the Fenestron kind, with discontinuous perturbed shapes and also undulations extending transversely continuously from one trailing edge to the other.

FIG. 2 shows an embodiment of a structural element in accordance with the invention shown in perspective view, said structural element forming part of an anti-torque rotor of the Fenestron kind.

In this embodiment in accordance with the invention, the shape of the projecting and recessed orifices in relief constitutes undulations 9 of regular dimensions.

In another embodiment in accordance with the invention, the projecting and recessed portions in relief present a shape constituting undulations 9 that are irregular in dimensions (not shown).

In another embodiment in accordance with the invention, at least some of the undulations 9 extend from one trailing edge 3 to the other trailing edge 4.

In another embodiment in accordance with the invention, at least some of the undulations 9 extend from a trailing edge 3 or 4 to at least one intermediate zone of the rear portion 2, said at least one intermediate zone 18 being located between the two trailing edges 3 and 4.

Figure 3:
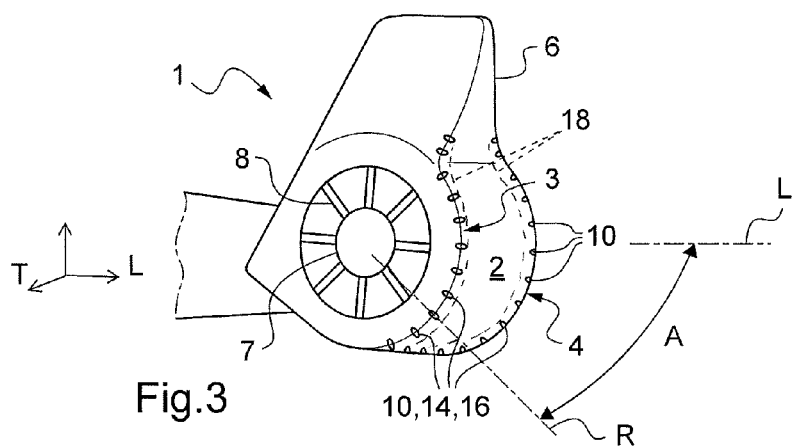
FIG. 3 shows another embodiment of a structural element in accordance with the invention in a perspective view, said structural element forming part of an anti-torque rotor of the Fenestron kind, with certain discontinuous perturbed shapes and/or continuous undulations from one trailing edge to the other forming an angle of orientation that is radial relative to a longitudinal direction of the structural element and thus of the aircraft that is fitted therewith.

FIG. 3 shows another embodiment of a structural element in accordance with the invention in a perspective view, said structural element forming part of an anti-torque rotor of the Fenestron kind In this embodiment, the perturbed shape 14 comprises protrusions 10 along each trailing edge 3 and 4 and on either side of an intermediate zone 18. The protrusions 10 are located in the vicinity of each trailing edge 3 and 4 and preferably astride the trailing edges 3, 4 and the rear portion 2.

In an embodiment, the undulations may thus be of short length and remain in the vicinity of the trailing edge, thus making it possible to arranged them on the high and low portions of the rear portion.

In FIGS. 2 and 3 in particular, it can be seen that in the invention some of the discontinuous perturbed shapes 15, 16 and/or some of the continuous undulations extending from edge to edge are not "horizontal", but are rather oriented in a manner that is distributed radially.

We assume firstly that the longitudinal direction L is horizontal. We also assume that the transverse span of the fairing 1 defines a transverse direction T that is also assumed to be horizontal. It is in the transverse direction T that the span of the fairing 1 extends. Together the longitudinal direction L and the transverse direction T define an attitude plane (L, T).

Furthermore, each discontinuous perturbed shape and/or each continuous undulation extends in an orientation eigenplane (i.e. a proper orientation plane) referenced R in FIGS. 2 and 3. Each orientation eigenplane R of a discontinuous perturbed shape and/or each continuous undulation is parallel to the transverse direction T, but forms a radial orientation angle A relative to the attitude plane (L, T).

Some of the discontinuous perturbed shapes and/or continuous undulations form a radial orientation angle A that is said to be increasing, as shown in FIG. 2. Such an increasing radial orientation angle A is such that going from the front towards the rear of the fairing 1, the orientation eigenplane R that intersects the attitude plane (L, T) towards the front of the fairing 1 becomes ever more distant from the attitude plane (L, T) towards the rear of the fairing 1 and towards the top of the fairing 1.

Other discontinuous perturbed shapes and/or continuous undulations form a radial orientation angle A that is said to be decreasing, as in FIG. 3. Such a decreasing radial orientation angle A is such that from the front towards the rear of the fairing 1, the orientation eigenplane R still intersects the attitude plane (L, T) towards the front of the fairing 1, and becomes ever more distant from the attitude plane (L, T) towards the rear of the fairing 1, but on going towards the bottom of the fairing 1.

From the figures, it can be understood that the various orientation eigenplanes R of the discontinuous perturbed shapes and/or of some of the continuous undulations intersect and are not parallel with one another.

By way of example, protrusions may also be provided on all of the visible edges.

In another embodiment in accordance with the invention, the perturbed shape includes cavities 17 along each trailing edge 3, 4 and preferably astride the trailing edges 3, 4 and the rear portion 2.

The fairing 1 in accordance with the invention may also be any component part of a structural element for an aircraft that does not constitute an airfoil surface.

The invention also applies to a ducted anti-torque tail rotor for a rotary wing aircraft, in particular for a helicopter. The structural element includes a hub 7 having blades 8 mounted thereon, means for driving the hub in rotation, and means for adjusting the blades. Such a rotor includes the fairing 1 as described above.

In an embodiment in accordance with the invention, the fairing 1 has two open side portions 11 and 12 that are substantially parallel, and that are situated on either side of the hub 7 (FIG. 2). Each of the open side portions 11 and 12 is terminated towards the rear by a respective trailing edge 3 or 4, and the rear portion 2 of the fairing 1 forms a clearly-defined base extending between said trailing edges 3 and 4.

In an embodiment in accordance with the invention, the base-forming rear portion 2 presents at least one curvature in a vertical and longitudinal plane of the aircraft.

The shape of the fairing 1 in accordance with the invention serves to excite instabilities in the air vortices 13 in the span of the base-forming rear portion 2. These transverse instabilities accelerate dissipation of the wake, and thus reduce the average size of the separated zone. This reduction in the length of the average separation has the effect of reducing the aerodynamic drag due to the shape of the fairing 1.

The concept of "average separation" may be defined in the present invention as the average length of the zone in which vortices are concentrated. The average separation is the separation shape that appears on calculating or measuring in the units, the mean field in flow. For example, it is possible to measure speeds in the wake and calculate their mean value at each three-dimensional point in the wake. This produces a time-averaged shape for the wake. When there is a base, this may generally represent one or two large vortices that are then referred to as average separations.

Naturally, the present invention may be subjected to numerous variations of the embodiments described, without thereby going beyond the ambit of the invention.

What is claimed is:

1. A fairing for a ducted anti-torque tail rotor structure for a rotary wing aircraft, the ducted anti-torque tail rotor structure having a substantially longitudinal direction (L), the fairing having a rear portion that is substantially orthogonal to the longitudinal direction (L), said rear portion extending across a transverse span of the fairing between two transversally spaced-apart trailing edges and thus presenting a determined width, said rear portion closing at least a portion of the internal volume defined by the fairing and generating aerodynamic drag in forward flight, wherein the rear portion presents, at the trailing edges, recessed shapes that are perturbed on the streamlines of the air-flow and that are transversely discontinuous between the trailing edges of the ducted anti-torque tail rotor structure for the rotary wing aircraft, the recessed shapes being angularly spaced apart from one another along the trailing edges; the recessed shapes extending transversely and discontinuously from one trailing edge to the other trailing edge, over the surface of the rear portion located between the trailing edges; the recessed shapes forming and bounding an intermediate zone of the rear portion, said intermediate zone being located between two opposed recessed shapes on the two trailing edges.

2. A fairing according to claim 1, wherein the ducted anti-torque tail rotor structure for the rotary wing aircraft is further having at least one continuous perturbed shape having recessed portions in relief extending transversely continuously from one edge to the other on the rear portion located between the trailing edges.

3. A fairing according to claim 1, wherein at least one discontinuous perturbed shape presents projecting and recessed portions in relief of irregular dimensions to continually vary in the longitudinal direction (L) when measured in a direction transverse (T) to (L) from the respective trailing edge.

4. A fairing according to claim 1, wherein the fairing includes at least one continuous undulation that extends from one trailing edge to the other, in addition to at least one transversely discontinuous perturbed shape along its span.

5. A fairing according to claim 1, wherein at least one discontinuous perturbed shape extends from one trailing edge to at least an intermediate zone of the rear portion, said intermediate zone being located between the two trailing edges.

6. A fairing according to claim 1, wherein at least one discontinuous perturbed shape includes protrusions (10) along each trailing edge.

7. A fairing according to claim 1, wherein at least one discontinuous perturbed shape includes cavities along each trailing edge.

8. A fairing according to claim 1, wherein at least one discontinuous perturbed shape and/or continuous undulation forms a radial orientation angle (A) that increases, said increasing radial orientation angle (A) being such that from the front towards the rear of the fairing, an orientation eigenplane (R) that intersects the longitudinal and transverse attitude plane (L, T) towards the front of the fairing becomes ever more distant from said attitude plane (L, T) on going towards the rear and towards the top of the fairing.

9. A fairing according to claim 1, wherein at least one discontinuous perturbed shape and/or continuous undulation forms a radial orientation angle (A) that decreases, said decreasing radial orientation angle (A) being such that from the front towards the rear of the fairing, an orientation eigenplane (R) that intersects the longitudinal and transverse attitude plane (L, T) towards the front of the fairing becomes ever more distant from said attitude plane (L, T) on going towards the rear and towards the bottom of the fairing.

10. A structural element for a helicopter, the element including a hub having blades mounted thereon, means for driving the hub in rotation, and means for adjusting the blades, wherein the element includes a fairing with a rear portion that is substantially orthogonal to the longitudinal direction (L), said rear portion extending across a span of the fairing between two spaced-apart trailing edges and thus presenting a determined width, said rear portion closing at least a portion of the internal volume defined by the fairing and generating aerodynamic drag in forward flight, wherein the rear portion presents, at least one pair of opposed shapes positioned on the trailing edges and extending inwardly less than half of the determined width of the rear portion to be transversely discontinuous along the span between said trailing edges, the recessed shapes being perturbed on the streamlines of the air-flow.

11. A structural element according to claim 10, wherein the fairing includes two open lateral portions that are substantially parallel and that are situated on either side of the hub, each of said lateral portions being terminated towards the rear by a trailing edge, said rear portion of the fairing forming a base that extends between the trailing edges.

12. A structural element according to claim 10, wherein the base-forming rear portion presents curvature at least in a vertical and longitudinal plane of said structural element.

13. A rotary wing aircraft including a ducted anti-torque tail rotor structure with a fairing having a rear portion that is substantially orthogonal to the longitudinal direction (L), said rear portion extending across a transverse span of the fairing between two transversally spaced-apart trailing edges and thus presenting a determined width, said rear portion closing at least a portion of the internal volume defined by the fairing and generating aerodynamic drag in forward flight, wherein the rear portion presents, at the trailing edges, recessed shapes that are perturbed on the streamlines of the air-flow and that are along the trailing edges of the ducted anti-torque tail rotor structure for the rotary wing aircraft, the recessed shapes being angularly distant from one another along the trailing edges, the recessed shapes extending transversely and discontinuously from one trailing edge to the other trailing edge, over the entire surface of the rear portion located between the trailing edges; the recessed shapes forming an intermediate zone of the rear portion, said intermediate zone being located between two recessed shapes each on one of the trailing edges.

14. A fairing according to claim 1, wherein the two spaced-apart trailing edges are parallel to one another.

15. A fairing according to claim 4, wherein the at least one continuous undulation includes a projecting portion and a recessed portion, each extending across the rear portion from one trailing edge to the other.

16. A structural element according to claim 12, wherein pairs of opposed shapes are distributed radially with respect to the hub.

17. A fairing according to claim 1, wherein the intermediate zone located between two opposed recessed shapes is free of recessed shapes.

18. A fairing according to claim 1, the failing having first and second lateral portions that are substantially parallel on either side of the hub and terminate at the rear portion of the fairing thereby forming the trailing edges;
   wherein aligned pairs of protrusions are provided astride the trailing edges, each protrusion extending from a respective one of the lateral portions to extend transversely along a portion of the rear portion.

19. A fairing according to claim 18, wherein the streamlines are generally parallel to the longitudinal direction (L) from air-flow over the lateral portions, wherein the fairing excites instabilities in air vortices downstream of the span of the rear portion to accelerate dissipation of the wake and reduce an average size of a separated zone.

20. A fairing according to claim 2 having at least two regions of recessed discontinuous shapes on the rear portion and at least two regions of continuous shapes on the rear portion, wherein the regions of discontinuous recessed shapes and the regions of continuous shapes alternate on the rear portion.

\* \* \* \* \*